Jan. 21, 1964  P. GIROT  3,118,523
CONNECTING ELEMENT FOR EXPANSION JOINTS
Filed Jan. 29, 1960  4 Sheets-Sheet 1

INVENTOR:
PIERRE GIROT

By Stevens Davis Miller + Mosher
Attorneys

Jan. 21, 1964 P. GIROT 3,118,523
CONNECTING ELEMENT FOR EXPANSION JOINTS
Filed Jan. 29, 1960 4 Sheets-Sheet 2

INVENTOR:
PIERRE GIROT
By Stevens Davis Miller + Mosher
Attorneys

Jan. 21, 1964  P. GIROT  3,118,523
CONNECTING ELEMENT FOR EXPANSION JOINTS
Filed Jan. 29, 1960  4 Sheets-Sheet 3
FIG.5
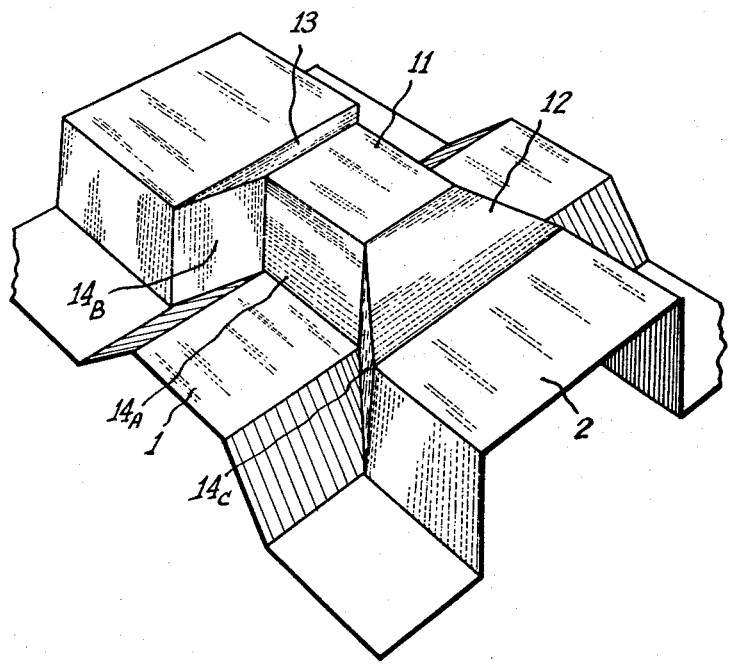
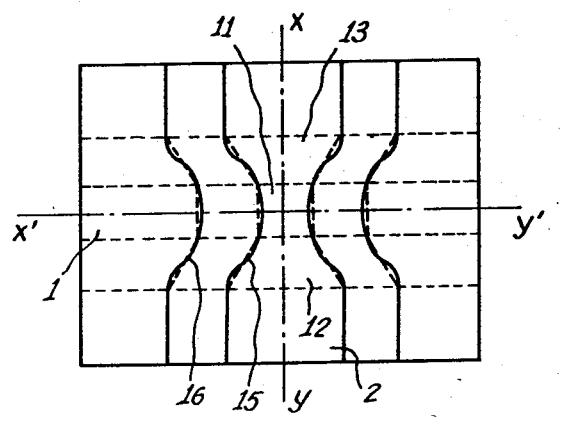
FIG.6
Inventor
Pierre Girot
By:
Stevens, Davis, Miller & Mosher
Attorneys

United States Patent Office 3,118,523
Patented Jan. 21, 1964

3,118,523
CONNECTING ELEMENT FOR EXPANSION JOINTS
Pierre Girot, Paris, France, assignor to Le Methane Liquide and Societe d'Etude du Transport et de la Valorisation des Gaz Naturels du Sahara, S.E.G.A.N.S.
Filed Jan. 29, 1960, Ser. No. 5,387
1 Claim. (Cl. 189—34)

The present invention relates to a connecting element in the zone of intersection of two perpendicular corrugations of expansion joints made of metal sheet or plate.

Many apparatus of large dimensions comprising a metal casing having an operating temperature which is different from the ambient temperature and is either lower or higher, for example tanks for the storage of liquified gases, heat exchangers and chemical reactors: they are fitted with expansion joints to permit the successive expansions and contractions of the casing during successive periods of operation and inoperation. In the general case, these joints are disposed along two directions perpendicularly of the metal casing. When this metal casing is formed of a sheet or plate sufficiently thin to provide a certain degree of flexibility, it is possible to employ joints which are formed by one or more parallel corrugations of the metal sheet.

The use of such simple and efficient joints nevertheless involved certain difficulties, because of the impossibility of obtaining a fully satisfactory connection of two perpendicular corrugations at their intersection zone. In effect, the lines of connection of two corrugations could not then simultaneously follow the displacements along the two perpendicular directions, and it was necessary to accept deformations of the metal at the intersection zone: this zone thus constituted a point where stresses were concentrated and was a source of possible fracture.

The present invention enables the aforesaid disadvantages to be obviated and it provides a connecting element for two corrugations which is capable of simultaneously following the expansions and contractions of these corrugations with any superficial elongation or contraction of the metal. In particular, it permits the construction of tanks or reservoirs of very large capacity for liquefied gases with a very low boiling point, such as liquid methane, ethylene, oxygen or nitrogen.

The connecting element according to the invention is characterised by the fact that it is formed by a substantially planar top or cap surface connected to the corrugations by developable surfaces.

In the case where the two perpendicular corrugations are identical, a square is chosen as the top surface, the diagonals of this square being in the planes of symmetry of the corrugations, and it is connected to the metal sheet in the quadrants separated by the corrugations by cylindrical surfaces having a double curvature and with generatrices perpendicular to the planes bisecting the corrugations, these cylindrical surfaces being themselves connected to the corrugations by conical surfaces, the generatrices of which form re-entrant acute angles with those of the corrugations.

Such an element comprises in principle sharp edges which on the one hand separate the cylindrical surfaces from the conical surfaces and on the other hand the conical surfaces from the corrugations. In order to avoid a coldworking of the metal along these edges, it is frequently advantageous for an industrial construction to replace them by fillets or rounded portions with a small radius of curvature which only involves the appearance of small superficial deformations.

It is possible to employ a connecting element of substantially different form but also not causing any superficial elongation or contraction of the metal. However, this element is only used if one of the corrugations is given a cross-section different from the other and substantially trapezoidal. The top surface is then a rectangle, the axes of symmetry of which are in the planes of symmetry of the corrugations, being connected to the corrugation of trapezoidal cross-section by cylindrical surfaces of double curvature with generatrices perpendicular to the plane of symmetry of the corrugation, and to the other corrugation by cylindrical surfaces, the convexity of which is turned in the zone in proximity to its plane of symmetry towards the plane of symmetry of the corrugation which is of trapezoidal cross-section, and rejoining the flanks of this latter corrugation tangentially on both sides.

As in the preceding case, sharp edges are in principle also provided, which are formed by the prolongation of the edges of the trapezoidal corrugation, and it is preferred in practice to replace the sharp edges by fillets or rounded portions of small radius of curvature in order to avoid a coldworking of the metal sheet along the latter.

The connecting elements for two corrugations of expansion joints and conforming to the foregoing general definition have the essential advantages that there is no superficial elongation or contraction of the metal, and as a consequence no stress in the metal, whatever may be the expansions or contractions of the said two corrugations; this imparts to the expansion joints a maximum degree of flexibility in the operation thereof. This property is due to the fact that the connecting element is obtained from a plane surface by means of multiple folds or bends, the various geometrical figures defined by the folding lines being strictly maintained during the folding in order to obtain the final form.

While accepting the occurrence of small superficial contractions or elongations of the metal at certain points, it is also possible to achieve a form of connecting element comprising two corrugations which is essentially different from those previously referred to and which is applicable in the case where the two perpendicular corrugations are identical. This connecting element comprises a dome-shaped top or cap, connected to each of the corrugations by two inclined surfaces which are symmetrical to the plane of symmetry of the perpendicular corrugation, and four convex trihedrons having as planes of symmetry the planes bisecting the corrugations, connected to the flanks of adjacent corrugations, by a substantially planar surface of quadrilateral form, and to the surface of the metal of the corresponding quadrant by a substantially plane surface of triangular form. As for the previous connecting elements, it is generally preferred to replace the sharp edges of the trihedrons thus defined by fillets having a small radius of curvature.

Connecting elements for the corrugations of expansion joints in accordance with the principle of the invention are now to be described by way of example and by reference to the accompanying drawing.

FIGURE 5 shows a connecting element for two different corrugations of trapezoidal cross-section presenting a polyhedral form.

FIGURE 6 represents the flat elements from which it is possible to obtain, by bending or folding, the connecting elements of FIGURES 4 and 5.

Figure 1:
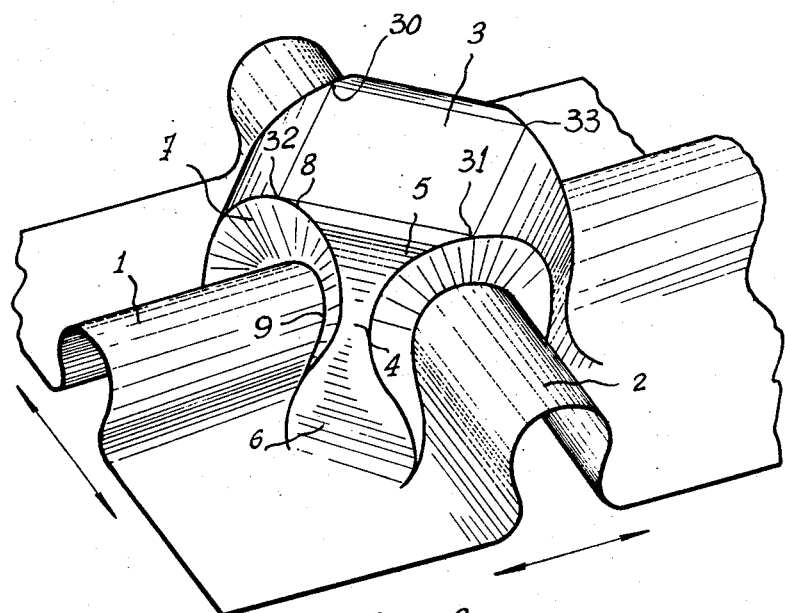
FIGURE 1 shows a connecting element for two identical corrugations having a cross-section in the form of an "omega" with a square top or cap surface.

The connecting element shown in FIGURE 1 is designed to permit the simultaneous expansions and contractions of the two corrugations 1 and 2. It comprises a top or cap portion 3 of square form connected to the metal sheet by cylindrical surfaces 4 having a double curvature; the concavity of these surfaces is directed towards the interior of the element in the upper zone 5 and outwardly in the lower zone 6. These cylindrical surfaces are connected to the corrugations by conical surfaces 7 limited by curvilinear edges 8 and 9. The plane of square 3 is tangential to said cylindrical surfaces, the junction lines being the sides of square 3. These junction lines are not materialised, the surfaces being tangential to each other, but they are drawn in thin lines in order to make the square easier realized.

Figure 2:
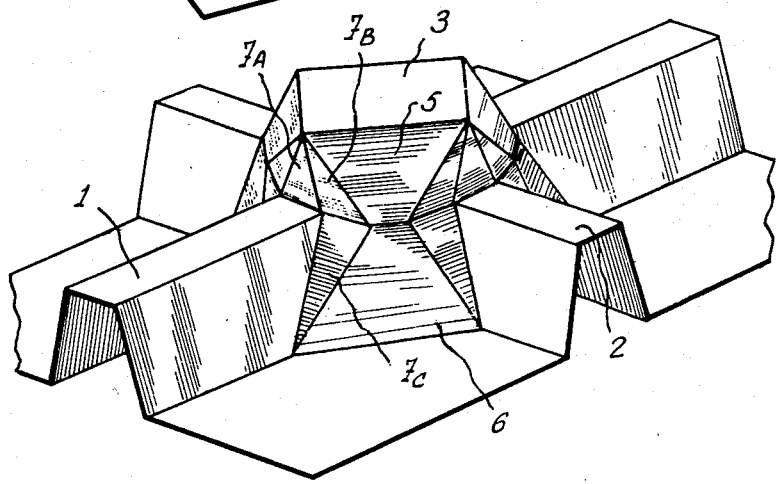
FIGURE 2 shows a connecting element for two identical corrugations of trapezoidal cross-section having a polyhedral form, and in which the connecting element of FIGURE 1 is derived by multiplication ad infinitum of the number of connecting triangles between the corrugations and the top surface.

The connecting element of FIGURE 2 is disposed at the intersection of the corrugations 1 and 2 which are of trapezoidal form. It also comprises a square portion 3. The latter is connected to the metal plate in the quadrants between the corrugations by two trapeziums 5 and 6 having a small base as a common edge. The connection to the corrugations is achieved by triangular elements 7A, 7B, 7C.

Figure 3:
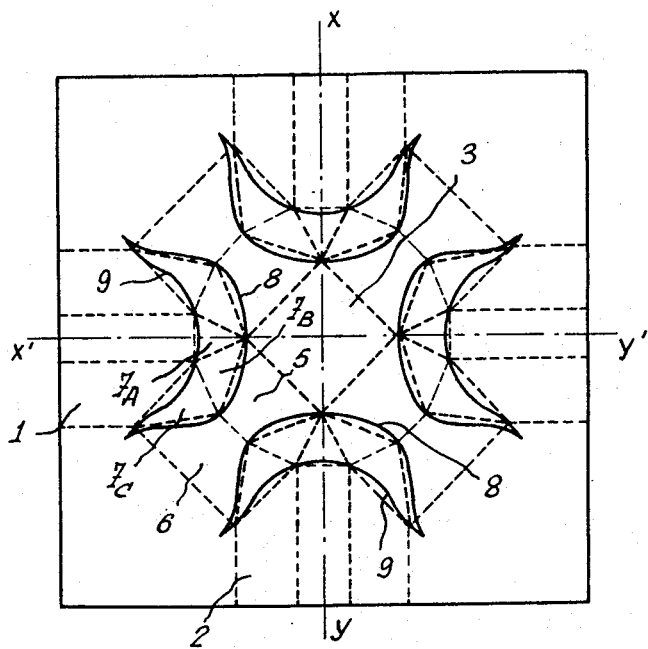
FIGURE 3 shows the flat elements from which it is possible to obtain, by folding or bending, either the connecting element of FIGURE 1 or that of FIGURE 2.

The surface elements of the two preceding figures are found in FIGURE 3, which shows the flat elements from which the connecting elements are obtained by bending or folding. The curvilinear edges 8 and 9 are shown in full lines and the other edges in broken lines. These flat elements naturally have the two rectangular axes of symmetry XY and X'Y'.

Figure 4:
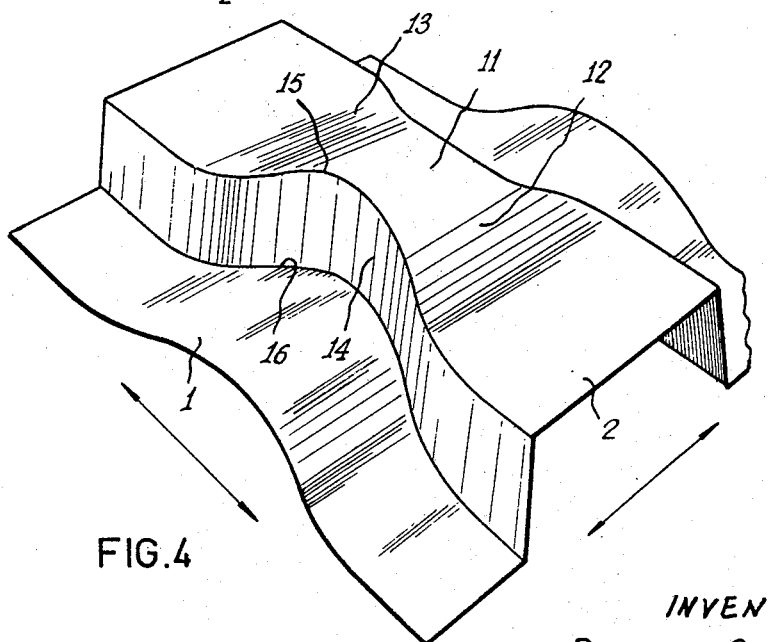
FIGURE 4 shows a connecting element for two corrugations, one of which is of trapezoidal cross-section and is different from the other.

The connecting element of FIGURE 4 connects the corrugation 1 having a cross-section of omega form to the corrugation 2 which is of trapezoidal cross-section. It comprises a rectangular surface 11 connected by cylindrical surfaces 12 and 13 to the upper part of the corrugation 2. Two cylindrical surfaces 14 defined by the edges 15 and 16 connect it to the corrugation 1 and to the flanks of the corrugation 2.

FIGURE 5 shows different trapezoidal corrugations 1 and 2. The top or cap surface 11 is a rectangle. It is connected to the upper part of the larger corrugation 2 by two trapeziums 12 and 13 and to the upper surfaces of the smaller corrugation 1 by two trapeziums such as 14A, which here are rectangles, and to the flanks of the two corrugations by parallelograms such as 14B, 14C.

FIGURE 6 represents the flat elements from which the elements of FIGURES 4 and 5 are obtained by bending. They also have two perpendicular axes of symmetry XY and X'Y'.

Figure 7:
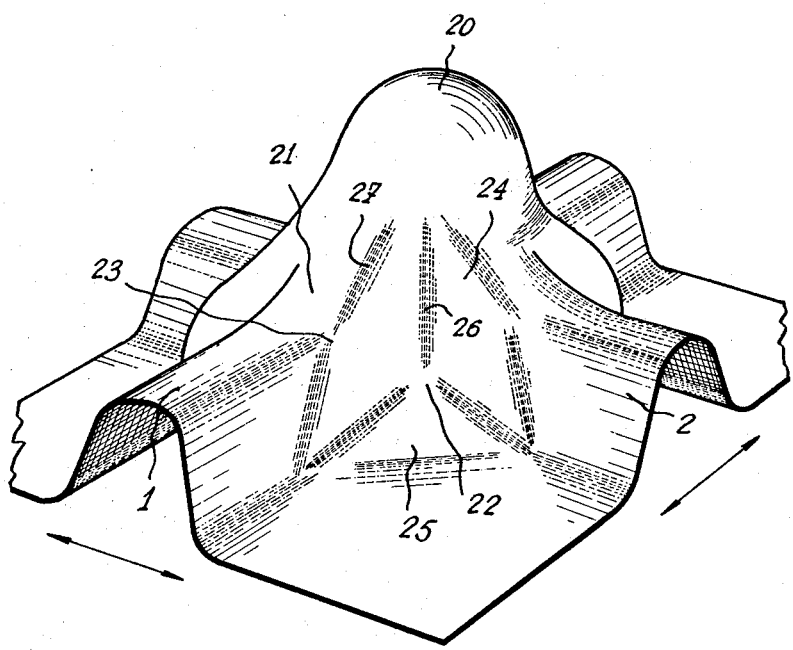
FIGURE 7 shows a connecting element for two identical corrugations, comprising a dome-shaped top or cap and lateral trihedrons.

FIGURE 7 represents a connecting element which is not strictly developable and having a dome-shaped top or cap 20, inclined surfaces 21 connecting this cap to the corrugations and trihedral surfaces 22 which are connected to the corrugations by the quadrilaterals 23, 24 and to the metal sheet of the quadrants between the corrugations by triangles 25, the edges of the trihedron preferably being replaced by rounded portions. An expansion of the sheets or plates causes the setting up of slight stretching deformations along edges such as 26 and slight contracting deformations along edges such as 27. These deformations are however much smaller than those which would occur at the intersection of the corrugations in the absence of this connecting element.

What I claim is:

Connecting element in the zone of intersection of two corrugations of a metal sheet, forming with the adjoining portions of said corrugations and of the metal sheet a continuous, unitary, assemblage having an approximately planar top surface, said assemblage having the form of a developable surface and being manufactured solely by folding operations effected according to folding lines, the various surfaces bounded by said lines being stretched neither during the operations which result in the final form of the connecting element, nor during the use of the apparatus which comprises said connecting element, said two corrugations being identical, and characterized in that the top surface is a square, the diagonals of which are in the planes of symmetry of said corrugations, and which is connected to the sheet in the quadrants separated by the corrugations by cylindrical surfaces having a double curvature and generatrices perpendicular to the planes bisecting said corrugations, these cylindrical surfaces being themselves connected to said corrugations by conical surfaces the generatrices of which form acute re-entrant angles with those of said corrugations.

References Cited in the file of this patent

UNITED STATES PATENTS

| | | |
|---|---|---|
| 655,941 | Ross | Aug. 14, 1900 |
| 973,442 | Lees | Oct. 18, 1910 |
| 1,064,958 | Bidle et al. | June 17, 1913 |
| 1,296,913 | Brewer | Mar. 11, 1919 |
| 1,669,629 | Russell | May 15, 1928 |
| 2,229,888 | Fraser | Jan. 28, 1941 |

UNITED STATES PATENT OFFICE
CERTIFICATE OF CORRECTION

Patent No. 3,118,523                           January 21, 1964

Pierre Girot

It is hereby certified that error appears in the above numbered patent requiring correction and that the said Letters Patent should read as corrected below.

In the heading to the printed specification, between lines 6 and 7, insert the following:

Claims priority, application France Feb. 20, 1959

Signed and sealed this 21st day of July 1964.

(SEAL)

Attest:

ESTON G. JOHNSON                             EDWARD J. BRENNER
Attesting Officer                                   Commissioner of Patents